United States Patent
Veni et al.

(10) Patent No.: US 11,282,206 B2
(45) Date of Patent: *Mar. 22, 2022

(54) IMAGE SEGMENTATION BASED ON A SHAPE-GUIDED DEFORMABLE MODEL DRIVEN BY A FULLY CONVOLUTIONAL NETWORK PRIOR

(71) Applicant: INTERNATIONAL BUSINESS MACHINES CORPORATION, Armonk, NY (US)

(72) Inventors: Gopalkrishna Veni, San Jose, CA (US); Mehdi Moradi, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 98 days.

This patent is subject to a terminal disclaimer.

(21) Appl. No.: 16/891,498

(22) Filed: Jun. 3, 2020

(65) Prior Publication Data

US 2020/0294242 A1 Sep. 17, 2020

Related U.S. Application Data

(63) Continuation of application No. 15/944,282, filed on Apr. 3, 2018, now Pat. No. 10,699,414.

(51) Int. Cl.
- *G06T 7/11* (2017.01)
- *G06N 5/04* (2006.01)
- *G06T 7/174* (2017.01)

(52) U.S. Cl.
CPC ............... *G06T 7/11* (2017.01); *G06N 5/046* (2013.01); *G06T 7/174* (2017.01); *G06T 2207/30048* (2013.01)

(58) Field of Classification Search
None
See application file for complete search history.

(56) References Cited

U.S. PATENT DOCUMENTS

| | | | |
|---|---|---|---|
| 9,405,996 | B2 | 8/2016 | Ionasec et al. |
| 9,406,142 | B2 | 8/2016 | Gorman, III et al. |

(Continued)

OTHER PUBLICATIONS

Kristiadi et al., "Deep Convolutional Level Set Method for Image Segmentation," J ICT Res Appl 11(3)284-298 (2017).

(Continued)

*Primary Examiner* — Bernard Krasnic
(74) *Attorney, Agent, or Firm* — Erik A. Huestis; Stephen J. Kenny; Foley Hoag, LLP

(57) ABSTRACT

Image segmentation based on the combination of a deep learning network and a shape-guided deformable model is provided. In various embodiments, a time sequence of images is received. The sequence of images is provided to a convolutional network to obtain a sequence of preliminary segmentations. The sequence of preliminary segmentations labels a region of interest in each of the images of the sequence. A reference and auxiliary mask are generated from the sequence of preliminary segmentations. The reference mask corresponds to the region of interest. The auxiliary mask corresponds to areas outside the region of interest. A final segmentation corresponding to the region of interest is generated for each of the sequence of images by applying a deformable model to the composite mask with reference to the auxiliary mask.

20 Claims, 11 Drawing Sheets

(56) References Cited

U.S. PATENT DOCUMENTS

| | | | |
|---|---|---|---|
| 10,699,414 B2* | 6/2020 | Veni | G06T 7/12 |
| 2008/0240526 A1 | 10/2008 | Suri et al. | |
| 2012/0230572 A1 | 9/2012 | Kohlberger et al. | |
| 2013/0085774 A1* | 4/2013 | Chen | G06G 7/60 705/2 |
| 2016/0098833 A1 | 4/2016 | Tsadok et al. | |
| 2017/0109878 A1 | 4/2017 | Yang et al. | |
| 2018/0042565 A1 | 2/2018 | Wilson et al. | |
| 2019/0304095 A1 | 10/2019 | Veni et al. | |

OTHER PUBLICATIONS

Le et al., "Reformulating Level Sets as Deep Recurrent Neural Network Approach to Semantic Segmentation," arXiv 1-10 (2017).

Ngo et al., "Combining deep learning and level set for the automated segmentation of the left ventricle of the heart from cardiac cine magnetic resonance," Med Image Anal 35:159-171 (2017).

Wang et al., "Automatic Whole Heart Segmentation Using Deep Learning and Shape Context," Res Gate 1-8 (2018).

Yu et al., "Segmentation of Fetal Left Ventricle in Echocardiographic Sequences Based on Dynamic Convolutional Neural Networks," IEEE 64(8):1886-1895 (2017).

Baghaie, AR. et al., "A Consistent Model for Cardiac Deformation Estimation Under Abnormal Ventricular Muscle Conditions," (2013).

Bardinet, E. et al., "Analyzing the Deformation of the Left Ventricle of the Heart with a Parametric Deformable Model," (2012).

Landgren, M. et al., "Segmentation of the Left Heart Ventricle in Ultrasound Images Using a Region Based Snake," 2013.

Schaerer, J. et al., "A Dynamic Elastic Model for Segmentation and Tracking of the Heart in MR Image Sequences," (2010).

Siemens et al., "A Fully Automatic and Fast Approach for Segmenting Left Ventricle and Myocardium from 4D (3D+1) Cardiac MRI Enabling Accurate Clinical Parameter Estimation by Providing Options to Include/Exclude Papillary Muscles," (Dec. 11, 2008).

Siemens et al., "A Robust Approach to Left Ventricle and Myocardium Segmentation from Temporal Sequence of MR Images," (Jul. 25, 2008).

List of IBM Patents or Patent Applications Treated as Related (Appendix P). Dated Jun. 3, 2020.

* cited by examiner

IMAGE SEGMENTATION BASED ON A SHAPE-GUIDED DEFORMABLE MODEL DRIVEN BY A FULLY CONVOLUTIONAL NETWORK PRIOR

CROSS-REFERENCE TO RELATED APPLICATIONS

This application is a continuation of U.S. application Ser. No. 15/944,282, filed Apr. 3, 2018, which is hereby incorporated by reference in its entirety.

BACKGROUND

Embodiments of the present disclosure relate to medical image segmentation, and more specifically, to image segmentation based on a shape-guided deformable model driven by a fully convolutional network prior.

BRIEF SUMMARY

According to embodiments of the present disclosure, methods of and computer program products for image segmentation are provided. In various embodiments, a time sequence of images is received. The sequence of images is provided to a convolutional network to obtain a sequence of preliminary segmentations. The sequence of preliminary segmentations labels a region of interest in the images. A reference mask is generated from the sequence of preliminary segmentations. The reference mask corresponds to the region of interest. A final segmentation corresponding to the region of interest is generated for each of the sequence of images by applying a deformable model to the composite mask.

DETAILED DESCRIPTION

Advances in deep learning have yielded simplified solutions in many challenging medical image environments. In particular, deep neural networks, such as fully convolutional architectures including U-Net, V-Net, and M-Net may produce segmentation results using a small-sized datasets. However, such machine learning approaches fail to produce accurate and reliable segmentation in echocardiography image sequences due to varying amounts of speckle noise accompanied with ill-defined and missing boundaries.

In certain areas, deep learning approaches fail to satisfy the needs of medical imaging. For example, deep learners trained on one dataset fail to perform satisfactorily on a different set of similar image types acquired with slightly varying imaging protocol or on a different scanner, due to overfitting.

Figure 1:
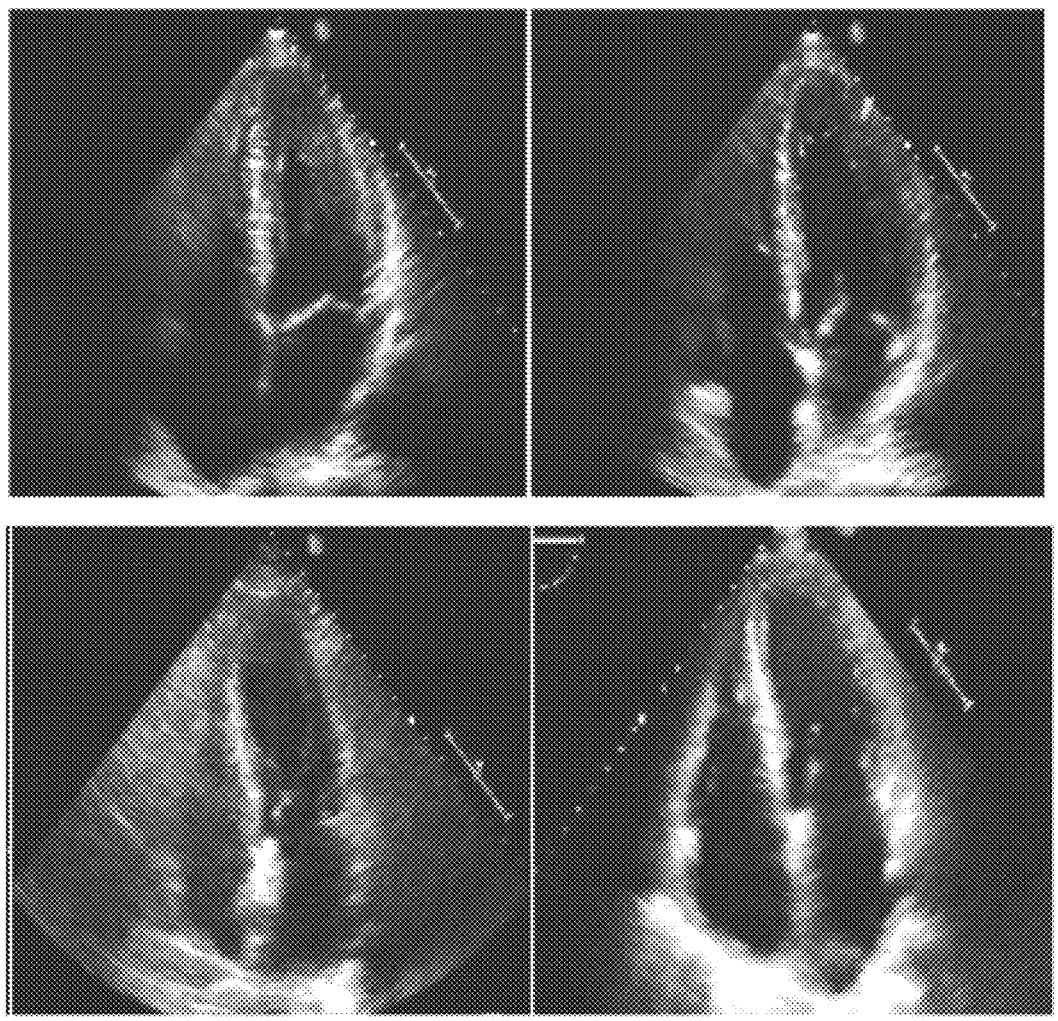
FIG. 1 contains exemplary B-mode four-chamber view echocardiography images.

Referring to FIG. 1, exemplary B-mode four-chamber view echocardiography images are provided, showing the presence of speckle noise and ill-defined boundaries. Segmenting anatomical structures in ultrasound images is made further difficult due to the varying amounts of speckle noise, and the presence of shadowing or signal loss. These difficulties result in apparent lack of borders and edges between structures. This is particularly common in the segmentation of B-mode echocardiography images of the heart. Additional challenges include the motion of the heart and the dynamics of the mitral valve.

Accordingly, there is a need to complement data-driven learning processes with knowledge of the expected shape of the desired structure.

To address this and other needs, the present disclosure provides for a combination of deep learning and a shape-driven deformable model in the form of level sets. In various embodiments, an end-to-end trained fully convolutional network acts as a prior to drive the level sets-based deformable model. An energy formulation is provided within the level set framework that accounts for characteristics of the desired structure. By employing the methods described herein, accurate and reliable segmentation of cardiac structures is achieved both qualitatively and quantitatively. In particular, several examples described herein relate to segmentation of left ventricles. However, it will be appreciated that the techniques provided herein are applicable to other anatomical imagery and is not confined to the heart.

Various embodiments enable the use of deep learning in difficult ultrasound segmentation problems. In various embodiments, deep learning is combined with post-processing driven by a shape-guided deformable model in the form of level sets. Specifically, methods are provided for tracking the boundaries of left ventricle in a four chamber view of the heart over the heart cycle. A level set energy is provided to account for characteristics of the left ventricle and its surrounding structures. This combination of deep learning and level set framework provide accurate segmentation with a potential application in automatic calculation of clinical parameters describing cardiac function.

It will be appreciated that alternative deformation models may be used according to the present disclosure. For example, statistical shape models such as active shape and appearance models, deformable shape models like level sets and atlas-based techniques may be applied.

In the context of echocardiography imaging, a typical method of acquisition delivers a clip of a few seconds in length, consisting of a sequence of B-mode images (such as those in FIG. 1), from each viewpoint. The images in this clip are all from approximately the same site, with small variations caused by the cardiac cycle and potential motion of the echocardiographer's hand. For accurate measurement of cardiac parameters, the boundaries of a given heart structure needs to be traces throughout a cycle. By way of illustration, and not limitation, examples herein focus on the left ventricle (LV) as seen in the apical four chamber view. However, it will be appreciated that the present disclosure may be applied to other views and to other anatomies.

Figure 2:
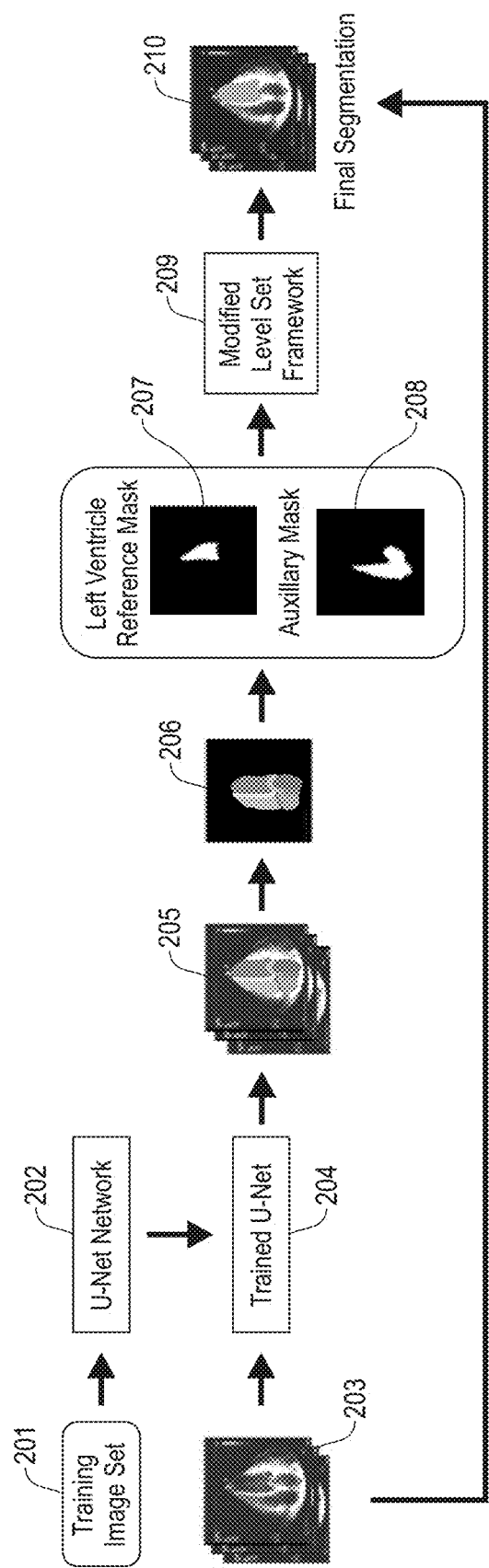
FIG. 2 illustrates the pipeline of a segmentation algorithm according to embodiments of the present disclosure.

Referring to FIG. 2, the pipeline of a segmentation algorithm according to embodiments of the present disclosure is illustrated. A training image set 201 is used to train a fully convolutional network (FCN) 202, such as U-Net, to generate a label map.

In some embodiments, the FCN uses a U-Net architecture, due to its ability to learn a network efficiently with a limited number of training examples. However, alternative networks may be used. In some embodiments, the network architecture comprises 23 convolutional layers. In some embodiments, the data augmentation step comprises random deformations of input images including translation, rotation, and scaling.

Following the training of the network, test image sequence 203 is provided to trained FCN 204. The end-to-end trained fully convolutional network (FCN) 204 is applied on each frame of the input sequence 203. Each pixel of each frame is annotated to the most likely heart structure, forming a sequence of label maps 205. In some embodiments, nine anatomical structures of the heart are labeled, including aorta, inter-ventricular septum, left ventricle, mitral valve, left atrium, inter-atrial septum, right atrium, tricuspid valve, and right ventricle.

Next, a pixel-wise statistical mode is computed across the all images in the clip, resulting in a single 2D segmentation 206. This serves as the initial template to drive further segmentation. In particular, the composite segmentation 206 is divided into a reference mask 207 for the region of interest (in this example the left ventricle) and an auxiliary mask 208 for all other labeled regions.

In the next stage, each frame of the clip is refined by applying a shape-based deformable model within the level set framework 209. The level set framework accounts for the noisy appearance of B-mode images and uses the FCN output as a prior.

The reference mask 207 obtained from the mode of FCN masks is used to drive the deformable model by warping the existing segmentation toward the desired boundaries. In this framework, the contour tends to propagate toward the desired boundary based on energy minimization. This energy is defined over external forces like image intensities and internal forces like geometrical properties of the contour, for example smoothness. To propagate the contour, level sets are used due to advantages including implicit and non-parametric representation, direct way to encode geometric properties of the propagating solution and handling of topological changes. Level sets work by embedding the propagating front as the zero-level set of a higher dimensional function, whose formulation of propagation is derived from Hamilton-Jacobi equation.

The final segmentation 210 is provided for each frame of the input sequence 203 based on the output of the level set framework 209.

Figure 3:
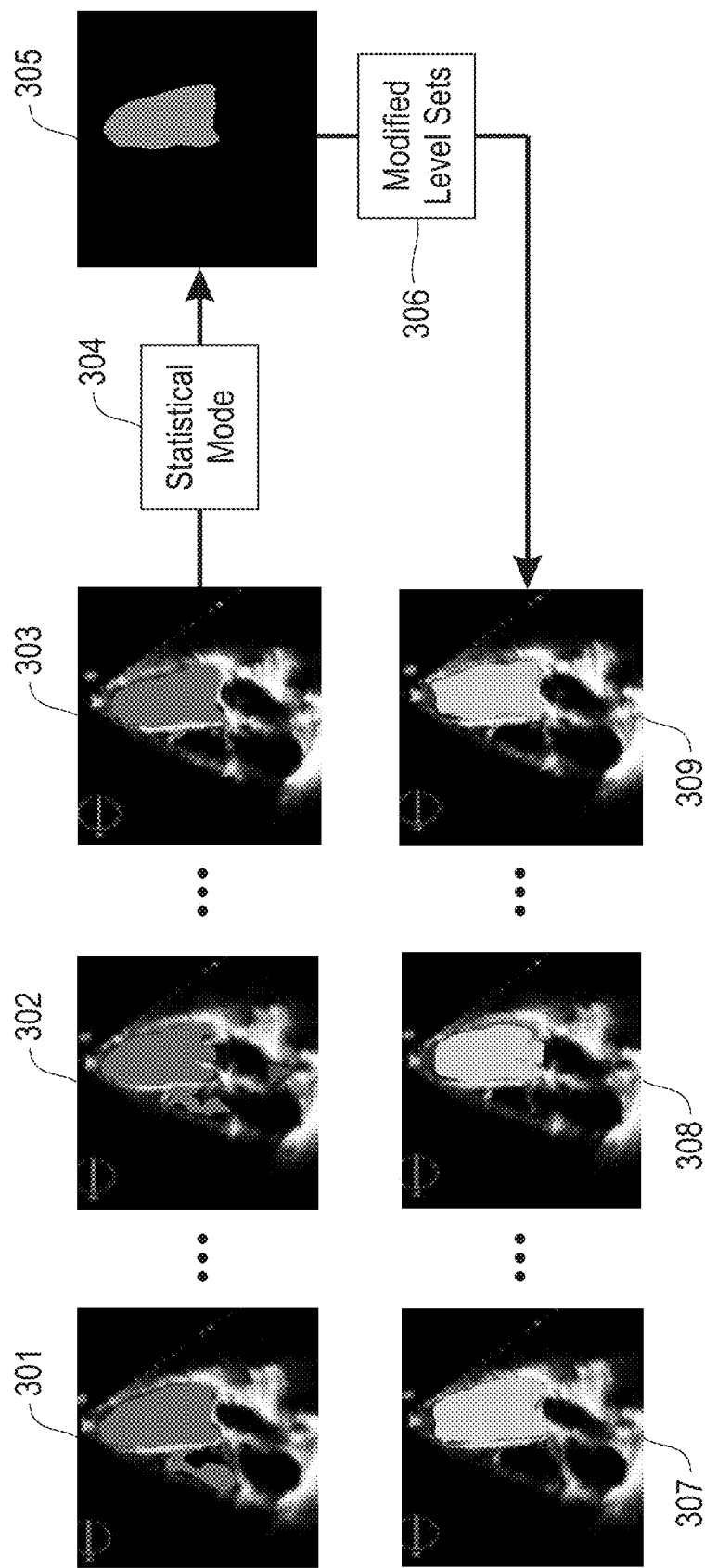
FIG. 3 illustrates exemplary segmentation results according to embodiments of the present disclosure.
Figure 4A:
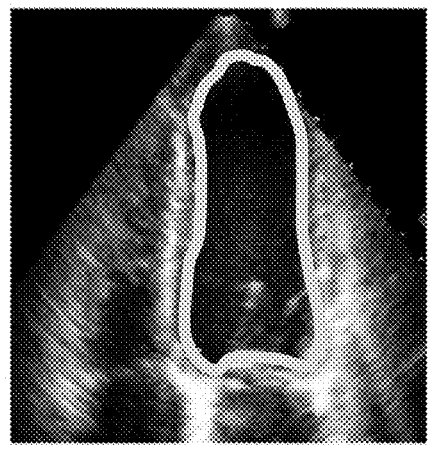
FIGS. 4A-C illustrates exemplary segmentation results according to embodiments of the present disclosure.
Figure 4A:
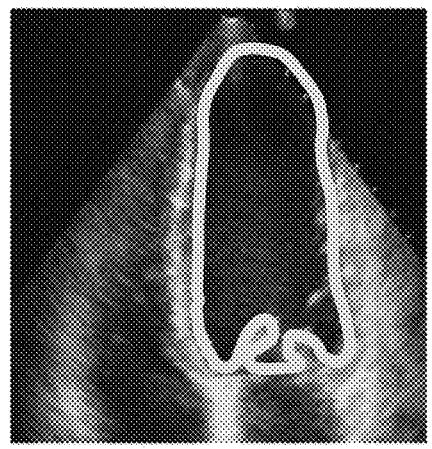
Figure 4A:
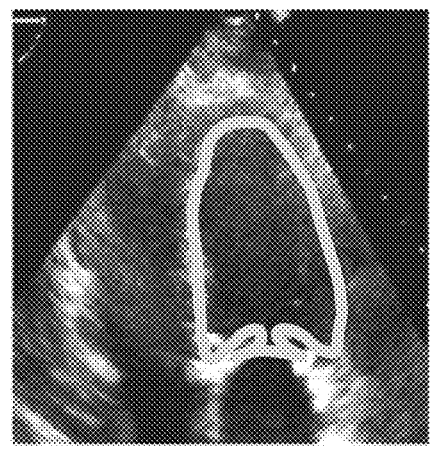
Figure 4B:
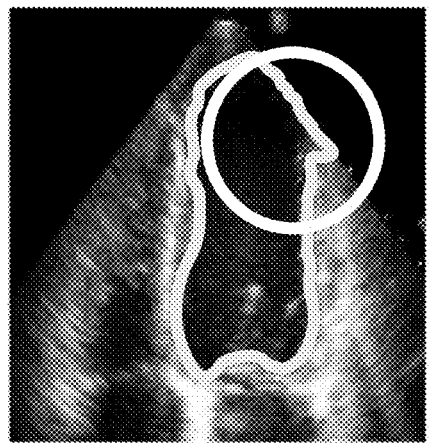
Figure 4B:
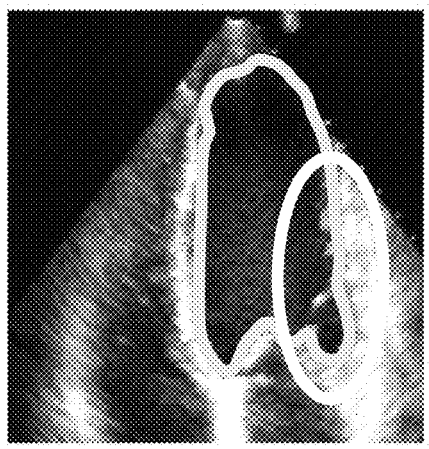
Figure 4B:
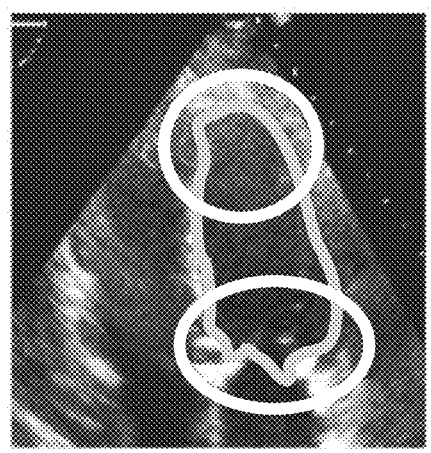
Figure 4C:
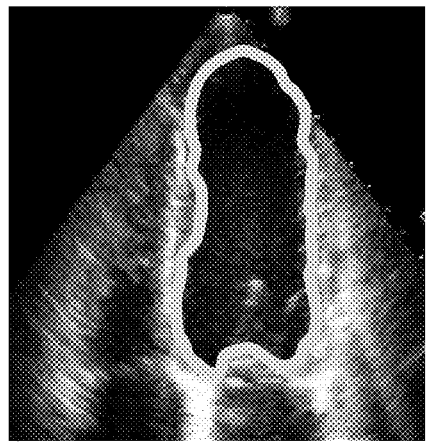
Figure 4C:
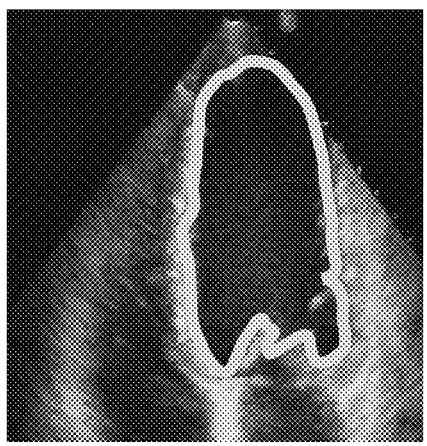
Figure 4C:
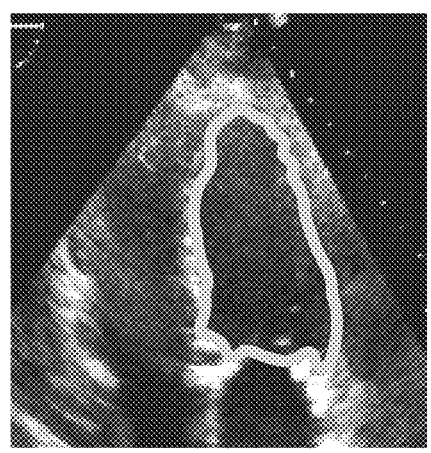

Referring to FIG. 3, exemplary segmentation results are illustrated. Three test images from a given clip are segmented by FCN 204 as set out above, resulting in segmented output 301 . . . 303. Segmented output 301 . . . 303 includes localized errors, and frames 301 . . . 302 produce incorrectly labeled regions that extend beyond the left ventricle. These undesirable segmentations occur due to the structural deformations created by the opening and closing of different valves over the cardiac cycle, thus preventing the segmentation algorithm from extracting accurate boundaries.

Statistical model 304 is applied to generate reference mask 305 as described above. The modified level set framework 306 is applied as set out above to generate final segmentations 307 . . . 309.

As noted above, in various embodiments, a level set energy is provided. Let s denotes the arc length parameter defined on an evolving curve C(s) over which the energy is formulated as in Equation 1.

$$E = \oint_{C(s)} f(I)ds \qquad \text{Equation 1}$$

In Equation 1, I denotes the given image and $f$ is some monotonic, decreasing function defined over I. One way to define $f$ is in terms of image region properties. Using the Chan-Vese energy functional, region-based energy metric is given by Equation 2.

$$f(I) = \int_{x \in \Omega}(I(x,s)-u)^2 dx + \int_{x \in \overline{\Omega}}(I(x,s)-v)^2 dx \qquad \text{Equation 2}$$

In Equation 2, $\Omega$ and $\overline{\Omega}$ define the interior and exterior of the evolving curve C and u and v denote the mean intensities over $\Omega$ and $\overline{\Omega}$ respectively. The hybrid variant of the Chan-Vese model evaluates image features only within a small neighborhood around each point of the evolving zero-level set. The derived energy is given by Equation 3.

$$E = \oint_{C(s)} \int_{x \in \Omega}(I_\chi(x,s)-u_l(s))^2 + \int_{x \in \overline{\Omega}}(I_\chi(x,s)-v_l(s))^2 ds \qquad \text{Equation 3}$$

In Equation 3, $u_l(s)$ and $v_l(s)$ denote mean intensities of points in a small neighborhood around a point on the zero-level set and $\chi$ defines the shape and size of neighborhood within which the evaluation takes place. From FIG. 1, it is apparent that the intensities corresponding to the left ventricle regions in B-mode echo cardiac images are typically homogeneous, whereas the intensities in surrounding regions are highly inhomogeneous and location dependent. To handle this situation, a new model is defined by inheriting the relevant expressions from both of the above models. This is achieved by leveraging the global region characteristics of the inner region as defined by the first term in Equation 2 and localized region features of the outer region as defined by the second term in Equation 3. Thus, the modified energy is defined as in Equation 4.

$$E = \oint_{C(s)} \int_{x \in \Omega}(I(x,s)-u)^2 dA + \int_{x \in \overline{\Omega}}(I_\chi(x,s)-v_l(s))^2 ds \qquad \text{Equation 4}$$

The evolution of contour is carried out by minimizing the level set energy defined in Equation 3 using a variational approach along a gradient descent direction. The resulting model tries to capture the global intensity characteristics inside the evolving contour, while accommodating locally varying intensities outside each point along the zero-level set. Based on the underlying assumption that intensities inside the desired structure are fairly homogeneous as compared to outside, this model reliably produces accurate segmentation.

Over the course of a cardiac cycle, the mitral valve opens and closes. As a consequence, an opening is created between LV and left atrium with no definite boundary separating the two structures. One drawback of a level set evolution or in general, any naive energy minimization solution, is that they tend to leak out of the desired structure at locations that are not properly bounded. To address this issue, the multi-label segmentation from the FCN is used. FCN (including U-Net) offers the algorithm a good starting point, and also aids the segmentation process in precluding areas that potentially belong to other structures. This capability is achieved by penalizing the evolving curve when it enters areas marked as other structures by FCN based labeling, thus impeding the algorithm to enter those regions.

The reference mask that is obtained from the statistical mode as described above. Using this reference mask, an auxiliary counterpart is generated by including only portions of the image corresponding to other structures. Let $M_I$ represent the auxiliary masked image and $d_f$ be its signed distance transform. The penalizing function that acts upon $d_f$ is given by Equation 5.

$$p(d) = e^{\beta d}; \quad d \leq 0$$
$$= 1; \quad \text{otherwise} \qquad \text{Equation 5}$$

This metric lets the auxiliary mask influence the evolving zero-level set only in undesired regions while leaving the rest of the image untouched. In other words, Equation 5 prevents the evolving curve to deform in unwanted regions by limiting its propagation. β acts as a relaxation parameter that scarcely allows the evolving curve to enter the auxiliary mask around its boundaries (β=0.9, in this example). This parameter is chosen based on the changes in shape and size of the desired structure (LV) that occur over the clip during cardiac cycle.

Referring to FIG. 4, segmentation results are illustrated according to embodiments of the present disclosure. FIG. 4A illustrates segmentation by a cardiac expert. FIG. 4B illustrates segmentation by U-Net+hybrid level set. FIG. 4C illustrates segmentation by the methods described herein. Contours are outlined to represent segmentation results. Ellipses highlight regions where segmentation fails.

In an exemplary test, the framework described herein is applied to segment left ventricles (LV) and track shape deformation across the cardiac cycle in B-mode echocardiography images. The data comes from two sources, each acquired under a research agreement, with IRB approval, from separate collaborating hospitals. In one dataset, single four chamber frames were provided from each patient. A cardiologist consultant traced the boundaries of the left ventricle on 40 of the images in this dataset. These were only used to train the U-Net network. The second dataset consisted of full clips. A cardiologist (GN) traced the boundaries of left ventricle and other structures in selected keyframes in ten separate clips in this dataset, including at least one image at systolic and one at distolic stages. This added up to 29 images. Thus, a total of 69 images were used to train the network. For testing, images from a separate set of eleven clips in the second dataset was used, in which twenty nine representative frames were annotated.

U-Net was implemented in Python by using the Keras framework. The training of the network was performed on an NVIDIA DIGITS DevBox for 150 epochs by using Adam optimizer. Additional parameters include a learning rate of 0.001, base number of filters equal to 32, a batch size of 12 with a number of batches per epoch equal to 50.

Given a test image clip, each frame was passed through the trained network to acquire initial segmentation masks per frame. Then, pixel-wise statistical mode is computed that chooses the most probable structure per pixel across the entire clip, resulting in a single 2D segmentation. Out of the statistical mode image, the left ventricle structure was separated from other heart structures. Since the target is the left ventricle, the reference mask is formed as the area of left ventricle and the auxiliary mask as the remainder of the heart. The level set framework is applied with penalty for auxiliary mask intrusion to produce the final segmentation in each frame of a given test clip.

To demonstrate the effectiveness of the algorithm provided herein, qualitative and quantitative evaluation were performed. For qualitative analysis, segmentation produced by U-Net+hybrid level set was visualized with the segmentation produced with the addition of auxiliary mask penalty.

FIG. 4 shows the manual segmentation (in FIG. 4A) and segmentation results on a small subset of test cases. The U-Net+hybrid level set method (in FIG. 4B) suffers from boundary leakage problems as highlighted with ellipses. On the other hand, the framework provided herein (FIG. 4C) outperforms this by correcting these inaccurate LV boundaries.

Figure 5:
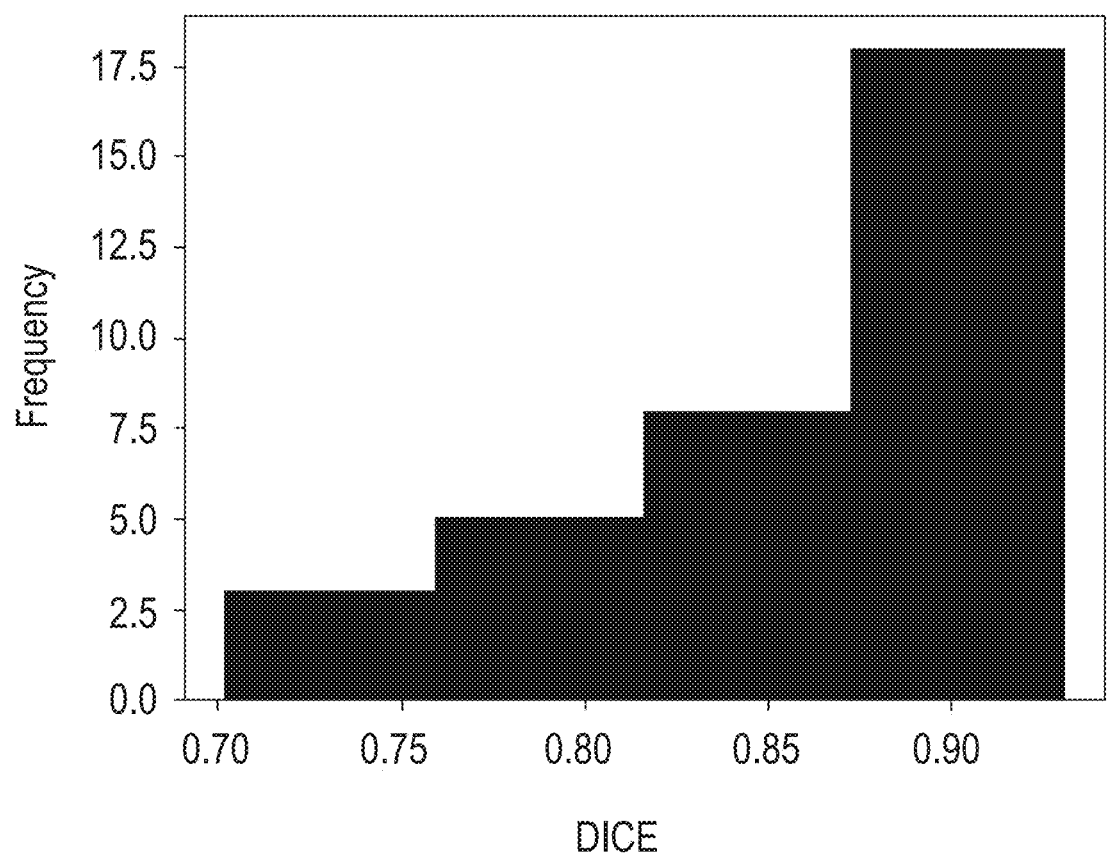
FIG. 5 is a Dice histogram of two segmented regions according to embodiments of the present disclosure.

Referring to FIG. 5, a Dice histogram of two segmented regions (manual and the methods described herein) is provided. The quantitative analysis has been carried out by computing the Dice metric to analyze the overlap percentage between segmentations corresponding to manual and the proposed algorithm. FIG. 5 shows the histogram plot of Dice metrics with the average Dice over all the test images being 0.86±0.06.

Figure 6A:
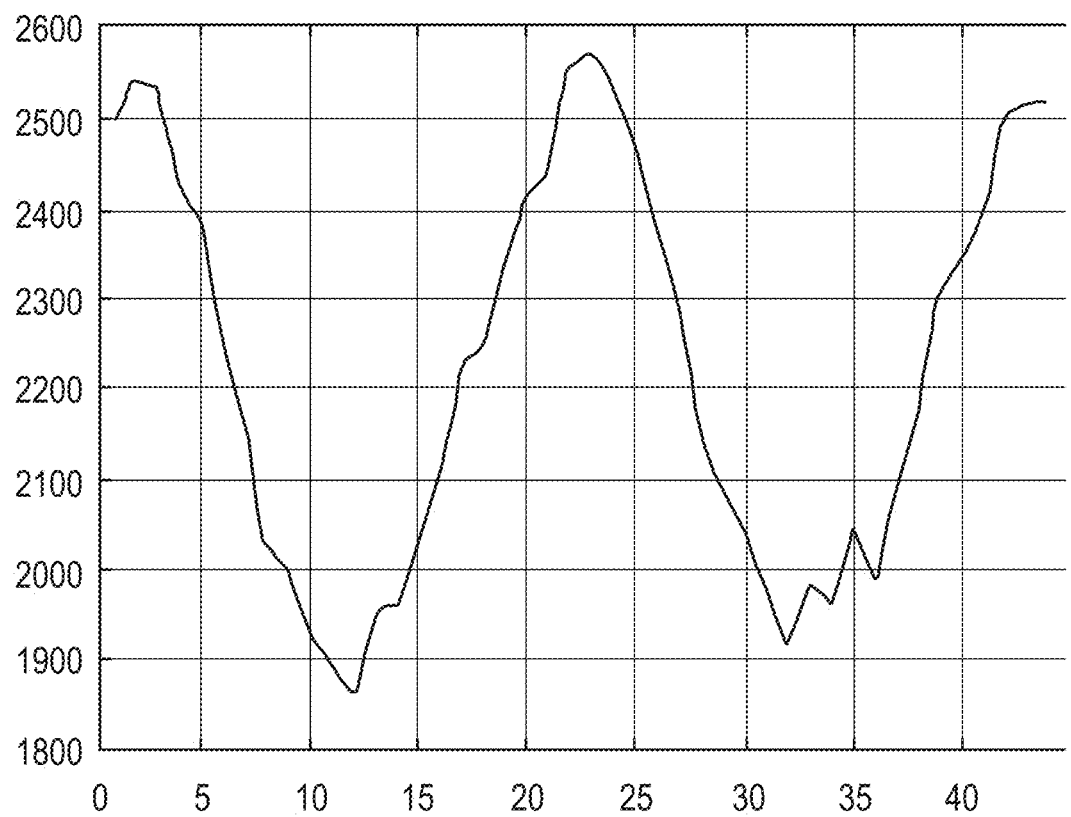
FIGS. 6A-B illustrate the rhythm of cardiac cycle on two test image clips.
Figure 6B:
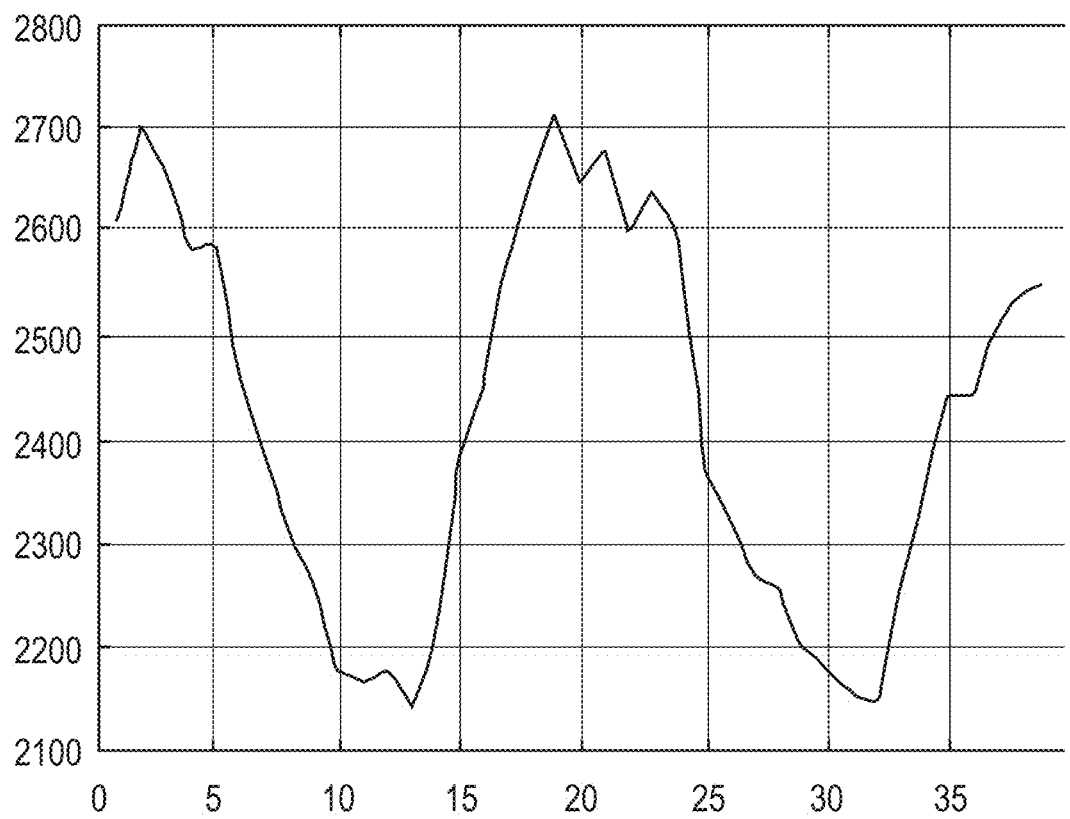

Referring to FIG. 6, the rhythm of cardiac cycle is illustrated on two test image clips. FIG. 6 shows that over 70% of test images produce above 90% Dice coefficient. This demonstrates the effectiveness of the algorithms provided herein in producing accurate results.

To show that the proposed methodology can improve clinical work-flow, we analyzed the variations in LV area during the heart cycle. Clinicians use approximate formulations to calculate the systolic and diastolic volume of the LV, and derive the ejection fraction based on these measurements. As FIG. 6 shows, the segmentation strategy provided herein provides a fairly accurate way of tracking the sinusoidal pattern of variations of the LV area.

Figure 7:
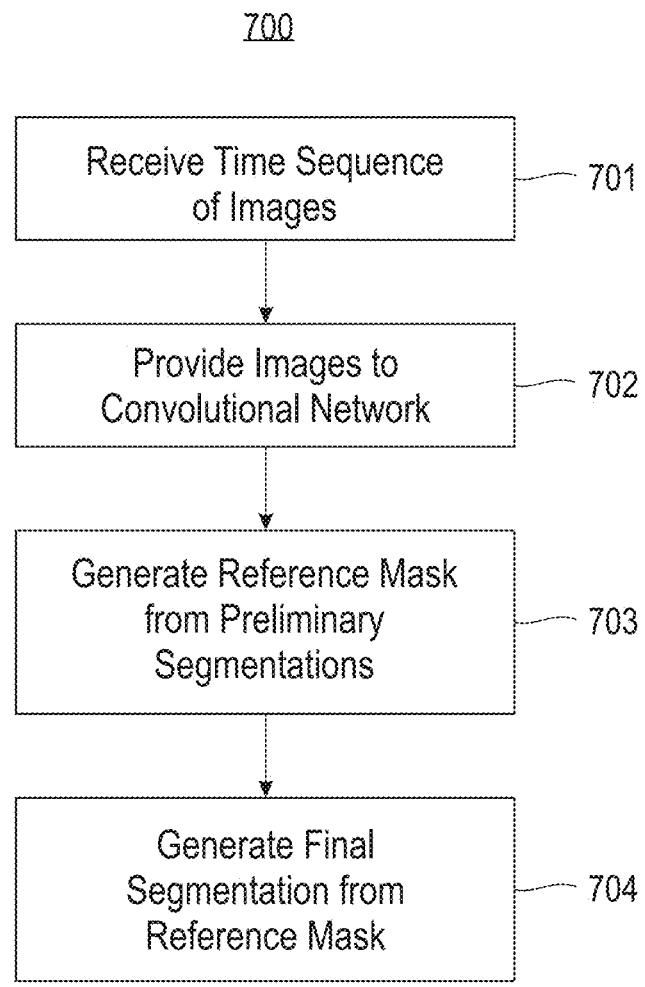
FIG. 7 illustrates a method of image segmentation according to embodiments of the present disclosure.

Referring to FIG. 7, a method 700 of image segmentation is illustrated according to embodiments of the present disclosure. At 701, a time sequence of images is received. At 702, the sequence of images is provided to a convolutional network to obtain a sequence of preliminary segmentations. The sequence of preliminary segmentations labels a region of interest in the images. At 703, a reference mask is generated from the sequence of preliminary segmentations. The reference mask corresponds to the region of interest. At 704, a final segmentation corresponding to the region of interest is generated for each of the sequence of images by applying a deformable model to the composite mask.

The present disclosure provides a framework to combine the benefits of deep learning approaches with those of classical segmentation methods. The FCN architecture produces LV masks over a sequence of slightly different images from the same site and view. These are then combined to form a prior for a level set method. The addition of a penalty in the level set frame-work for intrusion of the segmented area into the auxiliary mask produced by FCN has a corrective effect on the overall result. The clinical value of this work is in its potential for more accurate calculation of clinically relevant cardiac parameters.

Figure 8:
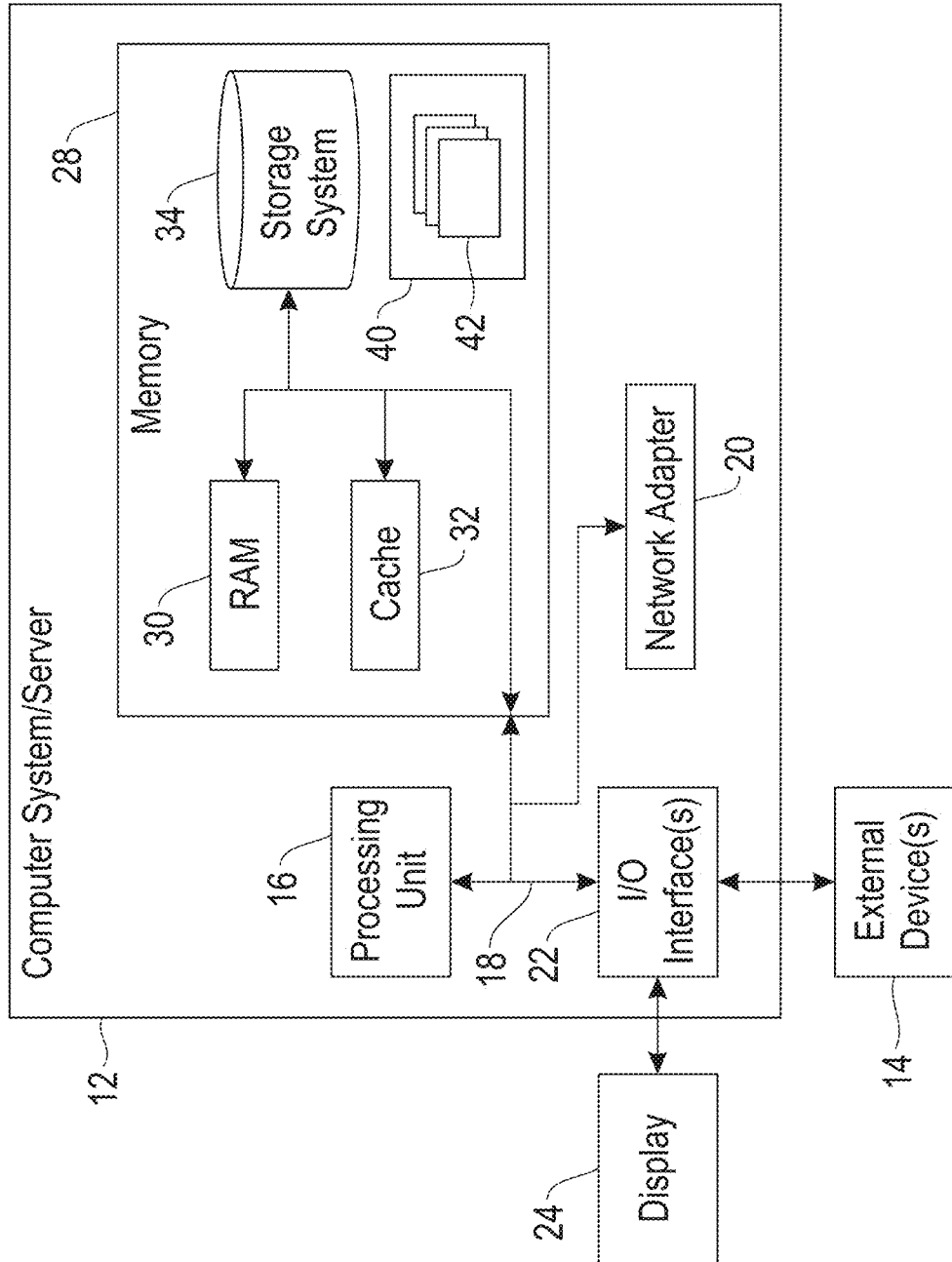
FIG. 8 depicts a computing node according to an embodiment of the present invention.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  receiving a time sequence of images;
  receiving a sequence of label maps, corresponding to the time sequence of images, the label maps labeling a region of interest and one or more auxiliary regions in the time sequence of images;
  generating a composite segmentation from the label maps;
  generating a reference mask based on the composite segmentation, the reference mask corresponding to the region of interest;
  generating an auxiliary mask based on the composite segmentation, the auxiliary mask comprising the one or more auxiliary regions and excluding the region of interest;
  generating a final segmentation corresponding to the region of interest for each of the sequence of images by applying a deformable model to the reference mask, the deformable model penalizing an evolving curve when it enters the auxiliary mask.

2. The method of claim 1, wherein the time sequence of images are echocardiography images.

3. The method of claim 1, wherein generating the reference mask comprises taking a pixel-wise statistical mode.

4. The method of claim 1, wherein generating the auxiliary mask comprises taking a pixel-wise statistical mode.

5. The method of claim 1, wherein the region of interest corresponds to a left ventricle.

6. The method of claim 1, wherein the region of interest corresponds to an aorta, inter-ventricular septum, mitral valve, left atrium, inter-atrial septum, right atrium, tricuspid valve, or right ventricle.

7. The method of claim 1, wherein the deformable model comprises level set.

8. The method of claim 1, wherein the deformable model minimizes a level set energy using a variational approach along a gradient descent direction.

9. A system comprising:
a datastore comprising a time sequence of images;
a computing node comprising a computer readable storage medium having program instructions embodied therewith, the program instructions executable by a processor of the computing node to cause the processor to perform a method comprising:
receiving the time sequence of images from the datastore;
receiving a sequence of label maps, corresponding to the time sequence of images, the label maps labeling a region of interest and one or more auxiliary regions in the time sequence of images;
generating a composite segmentation from the label maps;
generating a reference mask based on the composite segmentation, the reference mask corresponding to the region of interest;
generating an auxiliary mask based on the composite segmentation, the auxiliary mask comprising the one or more auxiliary regions and excluding the region of interest;
generating a final segmentation corresponding to the region of interest for each of the sequence of images by applying a deformable model to the reference mask, the deformable model penalizing an evolving curve when it enters the auxiliary mask.

10. The system of claim 9, wherein the time sequence of images are echocardiography images.

11. The system of claim 9, wherein generating the reference mask comprises taking a pixel-wise statistical mode.

12. The system of claim 9, wherein generating the auxiliary mask comprises taking a pixel-wise statistical mode.

13. The system of claim 11, wherein the region of interest corresponds to a left ventricle.

14. The system of claim 11, wherein the region of interest corresponds to an aorta, inter-ventricular septum, mitral valve, left atrium, inter-atrial septum, right atrium, tricuspid valve, or right ventricle.

15. The system of claim 11, wherein the deformable model comprises level set.

16. A computer program product for image segmentation, the computer program product comprising a computer readable storage medium having program instructions embodied therewith, the program instructions executable by a processor to cause the processor to perform a method comprising:
receiving a time sequence of images;
receiving a sequence of label maps, corresponding to the time sequence of images, the label maps labeling a region of interest and one or more auxiliary regions in the time sequence of images;
generating a composite segmentation from the label maps;
generating a reference mask based on the composite segmentation, the reference mask corresponding to the region of interest;
generating an auxiliary mask based on the composite segmentation, the auxiliary mask comprising the one or more auxiliary regions and excluding the region of interest;
generating a final segmentation corresponding to the region of interest for each of the sequence of images by applying a deformable model to the reference mask, the deformable model penalizing an evolving curve when it enters the auxiliary mask.

17. The computer program product of claim 16, wherein the time sequence of images are echocardiography images.

18. The computer program product of claim 16, wherein generating the reference mask comprises taking a pixel-wise statistical mode.

19. The computer program product of claim 16, wherein generating the auxiliary mask comprises taking a pixel-wise statistical mode.

20. The computer program product of claim 16, wherein the deformable model comprises level set.

* * * * *